May 19, 1936. L. G. BATES 2,041,222
APPARATUS FOR AND METHOD OF FEEDING MOLTEN GLASS
Filed Jan. 18, 1935
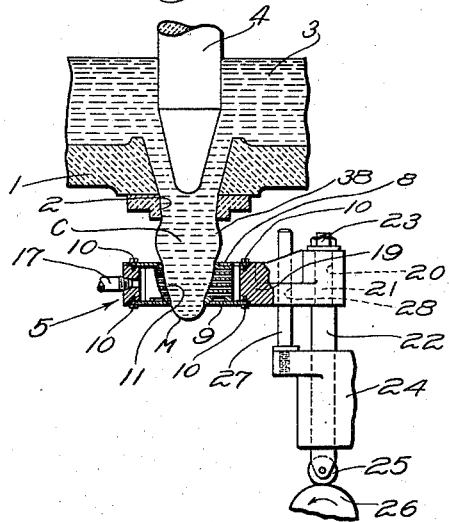
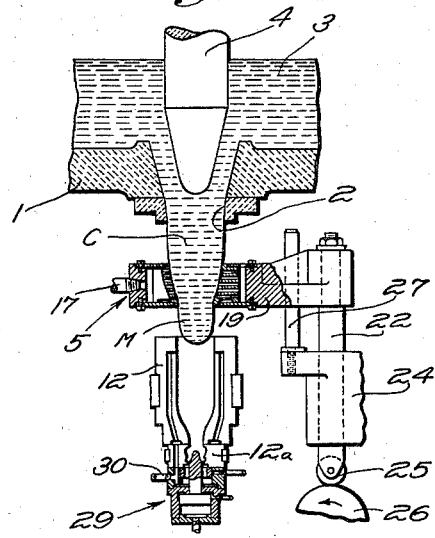
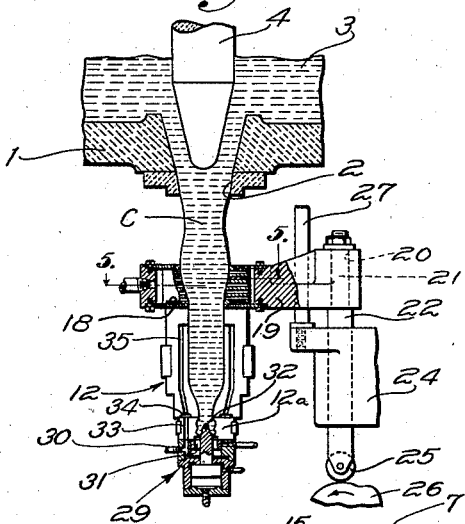
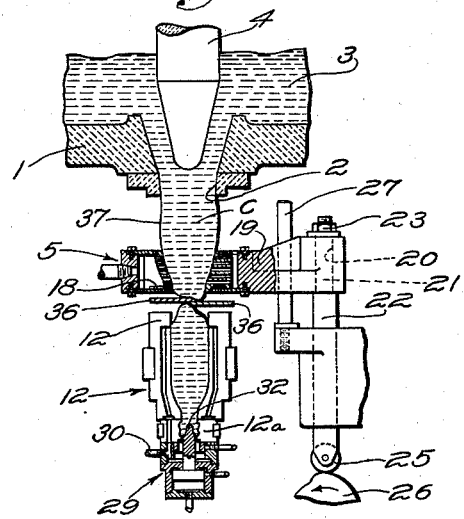
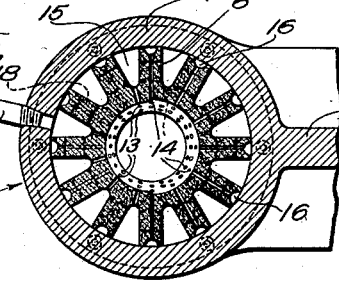
Witness;
W. B. Thayer
Inventor;
Lloyd G. Bates
by Brown + Parham
Attorneys Patented May 19, 1936

2,041,222

UNITED STATES PATENT OFFICE 2,041,222

APPARATUS FOR AND METHOD OF FEEDING MOLTEN GLASS

Lloyd G. Bates, West Hartford, Conn., assignor to Hartford-Empire Company, Hartford, Conn., a corporation of Delaware Application January 18, 1935, Serial No. 2,408

8 Claims. (Cl. 49—55)

This invention relates to improvements in apparatus for and methods of feeding molten glass in mold charges.

An object of the invention is to provide a glass feeding apparatus and method by which each of a series of molds which are successively presented beneath a downwardly opening submerged discharge outlet of a glass feeding container may be charged in an improved manner with glass of satisfactory thermal condition and viscosity without causing lapping, coiling or folding of any portion of the charge in the mold or objectionable differentials between the chilling contacts of different portions of the walls of the mold with different portions of the charge.

A further object of the invention is to provide an apparatus and method by which the foregoing object may be attained without the necessity of applying to the glass at or above the outlet any force other than gravity and head pressure.

In carrying out the invention, I may provide a vertically reciprocable feeder ring between and in axial alignment with both the discharge outlet of a glass feeding container and an underlying mold when the latter is at a glass receiving station beneath the outlet. Such a ring will not only shape a descending column of glass from the outlet to a cross-sectional configuration and size appropriate for the cavity of the mold to be charged but also will afford sufficient peripheral support of an intermediate portion of such a column to aid in controlling the formation and shape of the portion of the column above the ring and to prevent the portion of the column below the ring from attenuating at any place to an objectionable extent before such lower end portion of the column is disposed within the cavity of the underlying mold.

Such a ring may be used to facilitate and aid in the production of a regular series of charges appropriate for the molds to be fed and the actual loading of such molds with the charges in an improved manner. Thus, the internal shape and dimensions of the ring may be such as to adapt it for use as a reducing die for the descending glass column of glass, thereby not only permitting the use of a feeder container outlet of substantially greater area in cross section than that of the upper end of the cavity of each mold to be charged, with consequent relatively rapid issuance of glass from the outlet under gravity and head pressure, but also tending to iron out any irregularities at the periphery of the descending glass column.

For the accomplishment of this latter function efficiently, means may be provided in conjunction with this ring for producing a continuous film of gaseous or other fluid between the inner walls of the ring and the glass therein.

Also, the use of such a ring tends to reduce the thickness of the cooler skin or enamel at the periphery of the column of glass descending from the outlet and to make such column more nearly symmetrical in temperature and viscosity from its axial line to its periphery for the reason that the portion of the glass column between the ring and the outlet is of relatively great cross sectional area and thus includes a relatively great mass of glass of relatively high temperature from which heat passes radially outward to the surface of the glass column and thus tends to overcome the cooling effect on the glass column of the cooler surrounding atmosphere.

In effecting expeditious and improved charging of each underlying mold, the vertical movements of the ring may be predetermined and selected as to time, duration and character so that the downstroke of the ring will be effective to dispose within the mold cavity a mold charge mass of adequate length and cross sectional area to assure filling of the mold cavity to at least the greater part of its length with glass that will be brought into contact with the walls of the mold cavity at practically all points thereon at approximately the same instant when suction is applied to the mold cavity. The feeder ring may seat on the upper end of the mold when the ring is at the end of its downstroke and sealing of the mold cavity at its upper end by such ring and/or the glass passing therethrough thus may be utilized to render the suction applied to the mold cavity particularly effective in accomplishing quick and efficient charging of the mold cavity.

Fig. 1 is a fragmentary vertical sectional view of the outlet portion of a glass feeding container and of a feeder ring of the present invention in an operative position below the feed outlet, the view showing the relationship of the parts of the apparatus at an early stage in the formation of a mold charge;

Fig. 2 is a view generally similar to Fig. 1 but showing also a glass charge receiver, specifically a parison mold, at a charge receiving station beneath the feeder ring and showing the positions of the parts of the apparatus at a later stage in the formation of the mold charge mass;

Fig. 3 is a view similar to the preceding views but showing the parts in the positions which they may occupy after the charging of the underlying mold with glass but before the severance of the glass in the mold from the supply column of glass;

Fig. 4 is a view similar to the preceding views but showing the relationship of the parts of the device at the time of severance of the glass charge in the mold from the supply column of glass; and Fig. 5 is a relatively enlarged horizontal section, substantially along the line 5—5 of Fig. 3, through the feeder ring of the preceding views.

Referring to the drawing, the numeral 1, in Figs. 1 to 4 inclusive, designates a glass feeding container which has a discharge or feed outlet 2 in its bottom and which is adapted to hold a supply body of glass 3 by which such outlet is continuously submerged. The rate of issuance of glass from the supply body 3 from the outlet 2 under gravity and head pressure may be regulably controlled in any suitable manner, as by the use of a vertically adjustable refractory valve or implement 4, the lower end portion of which may depend into the glass in the outlet passage.

The glass feeding container, its outlet structure, and the means for regulably controlling the flow of glass from the supply body downwardly through and from the outlet may be of any suitable known construction as the details thereof, per se, form no part of the present invention. Also, any suitable known means may be provided to control the amount of glass in the container 1, the head of such glass over the outlet, and the temperature and viscosity of the glass passing to and issuing from the outlet.

A feeder ring contemplated by the invention is indicated generally at 5. This feeder ring may be of a composite character, including a core 6 composed entirely of or having an inner surface of brush carbon, or similar material, which may be heated to a relatively high temperature without molten glass sticking thereto, and an outer shell or holder 7 in which the core is supported and retained in place by any suitable means. For example, top and bottom plates 8 and 9, respectively, secured to the shell or holder 7 by cap bolts 10, or like fastening devices, may be employed to support and retain the core 6 in the holder 7.

The feeder ring 5 may have an internal shape or contour conforming approximately with that of a frustum of an inverted cone, as indicated at 11. The diameter of the upper end of this inverted frusto-conical bore of the feeder ring may approximate that of the lower end of the feed or discharge outlet 2, while the diameter of the feeder ring 4 at its lower end preferably will approximate that of the upper end of the cavity of the body of a mold 12, Figs. 2 to 4 inclusive, or other receiver that is to be charged with molten glass by the use of the feeder ring.

Means may be provided for producing a continuously self-renewing gaseous or other fluid film on the inner surface of the feeder ring. To produce such a film, the feeder ring may be provided with angularly spaced sets of radial perforations 13 alternating with angularly spaced perforations 14, the perforations 13 leading to the interior of the feeder ring from gaseous or fluid pressure supply chambers 15 and the perforations 14 taking the form of narrow ducts leading from the bore of the feeder ring to vertical exhaust passages 16 which communicate with the atmosphere.

A supply conduit 17, which may be adapted for connection with any suitable source of gas or fluid under pressure, delivers such gas or fluid to all the chambers 15, as by opening directly into one of such chambers when all the chambers 15 are connected in series, as by transverse ports 18.

Preferably, there are a sufficient number of the perforations 13 and adjacent perforations 14 in any given portion of the interior of the feeder ring to assure a practical continuous and uniform thin film of gas or other fluid between the glass column and the walls of the feeder ring when the feeder ring is in use, the gas or other fluid that is employed passing along the inner wall of the feeder ring from the respective perforations 13 to the adjacent perforations 14 and thence to the atmosphere. This protective film will keep the glass from direct contact with the walls of the feeder ring without subjecting such glass to any undesirable or irregular pressure. Heated air or water vapor, or other liquid vapors or fluid medium may be employed to form this protective film for spacing the glass column from the walls of the feeder ring, such medium being introduced to the interior of the feeder ring only under pressure sufficient to produce the desired film but insufficient to distort any portion of the glass column within the feeder ring.

The feeder ring may be supported for vertical reciprocation beneath and in line with the feeder outlet by any suitable means. A simple supporting and operating means, as shown in the drawing, comprises an arm 19, at one end of which the feeder ring is carried. At its other end, the arm 19 has a vertical opening 20 adapted to fit onto a reduced upper end portion 21 of a vertical operating shaft 22. Fastening means, indicated at 23, secure the arm 19 in place on the reduced upper end portion of the shaft 22. Such member 22 depends slidably through a vertical opening in a stationary bearing structure 24. The lower end of the member 22 carries a roller 25 resting upon and in rolling contact with the periphery of a suitable cam 26.

A detachable vertical guiding and retaining pin 27, carried by the structure 24, extends through a suitable vertical guideway or opening 28 in the arm 19, so that the bore of the feeder ring will be maintained directly below and in axial alignment with the outlet 2 when the parts are in their operative positions as shown in Figs. 1 to 4 inclusive. During a cessation of operations, the feeder ring may be swung laterally to an out-of-the-way position, the retaining pin 27 first having been removed from the structure 24.

The cam 26 may be of any suitable configuration, according to the character and extent of the vertical movements of the feeder ring which are to be effected during a cycle of operations. The means for driving the cam 26 may be of any suitable character and such means may be timed suitably with the operating mechanism (not shown) of the feeder and its associate glass working machinery.

A typical series of steps of the method of the invention, employing the apparatus shown in the drawing, will now be described.

Glass of the supply body 3 will issue from the outlet 2 by gravity and head pressure to form a pendant column C. If the effective cross-sectional area of the outlet 2 is substantially larger than that of the lower end portion of the bore of the feeder ring, as shown, the feeder ring beneath the outlet will serve as a reducing die by which the column of glass passing therethrough will be shaped and reduced to a size appropriate for the cavity of a mold that is to be charged.

As shown in Fig. 1, the lower end portion of the column 27, from which glass of a preceding charge has been severed, is supported by the feeder ring 5, which is in its raised position. The tip of a mo'd charge mass M is pendent from the bore of the feeder ring.

In Fig. 2, the pendant mold charge mass M below the feeder ring 5 has been augmented by glass from the column above and in the feeder ring. The feeder ring may still be at or near its upper limit of movement. The mold charge mass may attain a length while the feeder ring is in this position sufficient to dispose the extremity of such pendant mold charge mass in the upper end of the cavity of the mold 12, which in the meantime has been brought to a mold charging station below and in line with both the feeder ring and the outlet 2.

After the stage of operations shown in Fig. 2, the feeder ring 5 may be moved downwardly to lower the accumulating mold charge mass in the cavity of the mold 12. As shown in Fig. 3, the downward movement of the feeder ring 5 has been completed, such feeder ring resting upon the top of the mold 12. Suction may be applied to the interior of the mold cavity at approximately the time the feeder ring reaches its lowest position to draw downwardly into the mold cavity the depending mold charge mass and additional glass from the portion of the column 27 in and above the feeder ring, if required, to assure the charging of the mold cavity with a mass of glass which will contact with the walls of the mold cavity at approximately the same time at all points on such walls. In other words, the glass in the mold cavity will be subjected to chilling contact with the walls of such cavity for approximately the same length of time at all places as the portion of the mold cavity in which glass is to be disposed will be filled instantly with glass of the charge. The time of beginning of the application of suction may be earlier or later with good results and suction may be dispensed with under certain conditions, as when the neck ring or portion of the mold is relatively wide internal'y and/or time is available for the loading of the mold cavity without the use of suction.

For supplying suction to the interior of the mold cavity any suitable means may be employed. The mold structure shown in the drawing includes a combined neck pin mounting and head 29 through which sub-atmospheric pressure may be app'ied both to the interior of the neck ring 12a and to the body of the mold 12. A tubular conduit 30 may connect such mechanism with any suitable source of sub-atmospheric pressure. From the tube 30 sub-atmospheric pressure may be applied through the suction space 31 to the annular space in the neck ring 12a surrounding the tip of the neck pin 32. At the same time, sub-atmospheric pressure may be applied from the conduit 30 through the vertical passage 33, the annular groove 34, and the vertical spaces or passages 35 in the body of the mold to the cavity of such mold. The particular mechanism for applying suction to the interior of the mold does not, per se, form part of the present invention and therefore need not be further described as the same and other suitable generally similar mechanisms are well known in the art.

As shown in Fig. 3, the cavity of the mold 12 has been loaded with glass but the glass in the mold cavity has not as yet been severed from the glass of the supply column. If, immediately after the condition shown in Fig. 3 has been reached, the feeder ring is given an upward movement, preferably rapid, attenuation of the glass column between the feeder ring and that in the mold cavity may be effected. A suitable shearing device, represented by the shear blades 36 may be employed to cut through the attenuated portion of the glass column for severing the glass in the mold from the glass of the supply column, as shown in Fig. 4.

The upward movement of the feeder ring may serve to temporarily impound glass issuing from the outlet 2 above the feeder ring so that the portion of the glass column above the feeder ring may be slightly enlarged in diameter as indicated at 37 in Fig. 4, and at 38 in Fig. 1, it being understood that the Fig. 1 view discloses a step in a cycle of operations for charging the next mold as well as the final step in a similar cycle of operations by which the preceding mold was charged.

The shearing device and operating mechanism therefor may be of any suitable known construction and mode of operation. Timing mechanisms suitable for regulably controlling the operations of the shearing device and of the feeder ring in timed relation with each other and with the molds to be charged may be readily provided by those skilled in the art and hence need not be illustrated in the drawing nor described herein.

Preferably, the downward movement of the feeder ring and the application of sub-atmospheric pressure to the interior of the mold to be charged will be so timed with relation to each other and the feeder ring downstroke will be of such character that the lower limit of such downstroke will be reached and the application of sub-atmospheric pressure will be commenced at or just preceding the instant at which the lower end portion of the pendant mold charge mass has descended into contact with the walls of the mold cavity at the lower end or place of reduction of cross-sectional area of such cavity. However, such timing may be varied and the application of sub-atmospheric pressure may be commenced either before or after the downstroke of the feeder ring has ended and either before or after contact of the lower end portion of the pendant mold charge mass with walls of the mold cavity. Likewise, the downstroke of the feeder ring may end before or after such contact.

It is obvious that in lieu of the hereinbefore described simple supporting and operating mechanism for the feeder ring, any other suitable mechanism may be provided. Such mechanism may be more complex in structure and may include suitable adjustments for adjusting the amplitude of the vertical movements of the feeder ring and of the upper and/or lower limits of such movements independently of such adjustments thereof as may be obtained by the use at different times of cams 26 of different contours. Also, good results may be obtained by the use of the feeder ring without the provision of a gaseous or fluid film on the inner surface thereof, particularly when the inner surface of such inner ring is formed of brush carbon or like material. If gaseous or other flu'd film be employed, the walls of the feeder ring may be formed of metal or any suitable material other than brush carbon or like material. Many other details of the structure shown in the drawing may be changed or modified without departing from the spirit and scope of the invention.

I claim:

1. The combination with a glass discharge outlet from which glass issues from a supply body in a descending column of a charge receiver spaced below the outlet, and a vertically reciprocating feeder ring located between the outlet and said charge receiver in substantially axial alignment with both for receiving and preshaping each of successive portions of said descending column suitably for the cavity of the underlying charge receiver as each of said portions passes downwardly through said feeder ring into suspension therefrom and for lowering each such preshaped suspended portion of the glass column into the underlying charge receiver while effecting preshaping of glass of the succeeding portion of said column, and means for severing the glass between the feeder ring and said charge receiver when said feeder ring is at a position spaced above the charge receiver.

2. The combination with a glass feed outlet through which glass may issue from a supply body in a descending column, of a charge receiver located a substantial distance below and in substantially axial alignment with said outlet, a vertically reciprocating feeder ring located between said charge receiver and said outlet for receiving and preshaping each of successive portions of said descending column suitably for the cavity of the underlying charge receiver as each of said portions passes downwardly through said feeder ring into suspension therefrom and for lowering each such preshaped suspended portion into the underlying charge receiver while effecting preshaping of glass of the succeeding portion of said column, means for severing the glass between the feeder ring and said charge receiver, and means for producing a protective gaseous or fluid film between the walls of said feeder ring and the glass passing through said feeder ring and preshaped thereby.

3. In combination, a glass feed outlet through which molten glass may issue from a supply body in a descending column, a charge receiver located a substantial distance below the outlet and in substantially axial alignment therewith, the effective diameter of said outlet being substantially greater than that of the adjacent end of the cavity of said charge receiver, and a vertically reciprocable feeder ring located between said charge receiver and said outlet in substantially axial alignment with both for receiving and preshaping each of successive portions of said descending column suitably for the cavity of the underlying charge receiver as each of said portions passes downwardly through said feeder ring into suspension therefrom and for lowering each such preshaped suspended portion into the underlying charge receiver while effecting preshaping of glass of the succeeding portion of said column, means for severing the glass between the feeder ring and said charge receiver, said feeder ring having a tapering bore of a diameter at its upper end approximating that of said outlet and a diameter at its lower end approximating that of the upper end of the charge receiver.

4. In combination, a glass feed outlet through which molten glass may issue from a supply body in a descending column, a charge receiver spaced a substantial distance below the outlet and in substantially axial alignment therewith, a vertically movable feeder ring located between said outlet and said charge receiver in substantially axial alignment with both, said feeder ring being adapted to receive the lower end portion of glass column as it descends from said outlet and to shape successive portions of said column as they descend from the outlet through the feeder ring to a shape and size in cross section approximating those of the body of the glass receiving cavity of the charge receiver, said feeder ring being movable downwardly when a substantial portion of said glass column has passed through said feeder ring and is depending therefrom as a preshaped mold charge mass to lower said depending mass into the cavity of the charge receiver, and being movable upwardly when the cavity of the charge receiver has been filled with molten glass to attenuate the glass between that in the charge receiver and the feeder ring, and means for severing the attenuated portion of glass between said feeder ring and said charge receiver.

5. The method of loading an inverted parison mold or like charge receiver with glass obtained from a feed outlet that is located a substantial distance above the charge receiver and in substantially axial alignment therewith, which comprises applying a constricting force at the periphery of each of successively produced portions of a column of glass descending from said outlet at a plane located intermediate said outlet and said charge receiver to pre-shape the glass of said column passing below the plane at which said constricting force is applied to approximately fit a substantial portion of the cavity of the charge receiver, lowering the glass thus pre-shaped into the charge receiver while continuing to exert said constricting force on a further portion of the glass of said column in a plane that is lowered toward the charge receiver, and thereafter severing the glass in the charge receiver from the oncoming glass at a plane between said charge receiver and that at which said constricting force is being applied to the oncoming glass.

6. The method of charging an inverted parison mold or like charge receiver with molten glass which comprises positioning said charge receiver a substantial distance below and in substantially axial alignment with a glass feed outlet through which glass from a supply body issues in a descending column, shaping successively produced portions of said descending column of glass by applying a constricting force to said column at a place below said outlet and a substantial distance above said charge receiver, lowering the portion of the glass column below the place at which said constricting force is being applied to position said portion of the glass within the charge receiver, thereafter exerting a lifting force on the periphery of the glass column above the charge receiver, and severing the glass between that in said charge receiver and the place of application of said lifting force.

7. The method of charging an inverted parison mold or like charge receiver with molten glass which comprises positioning said charge receiver a substantial distance below and in substantially axial alignment with a glass feed outlet through which glass issues from a supply body in a descending column, shaping successive portions of said glass column between said charge receiver and said outlet by applying a constricting force to said column at a place intermediate said outlet and said charge receiver, lowering the portion of said glass column below the place of application of said constricting force into the cavity of the charge receiver when a mold charge mass of glass of substantial length has been formed below said place, applying subatmospheric pressure to the interior of the charge receiver to aid in forcing glass of said charge mass into contact with all portions of the walls of the charge receiving cavity of said charge receiver, thereafter attenuating the glass at the upper end of the charge receiver by applying an upwardly moving constricting force to the portion of the glass column above said charge receiver, and severing the glass in the charge receiver from said glass column by cutting through said attenuated portion of the glass.

8. The method of charging an inverted parison mold or like charge receiver with molten glass, which comprises positioning such charge receiver a substantial distance below and in substantially axial alignment with an outlet from which glass may issue from a supply body in a descending column, peripherally supporting and reducing the diameter of the descending column of glass at a place intermediate said outlet and the upper end of said charge receiver until a pendant mold charge mass of a size and shape appropriate for the cavity of the charge receiver has been provided as the lower end portion of said column, lowering said pre-shaped pendant mold charge mass into the cavity of the charge receiver, thereafter exerting a lifting force on the peripheral portion of said glass column above the charge receiver and simultaneously initiating the reduction of a further portion of said column to form a new pendant mold charge mass, and severing the glass in the charge receiver from the glass of the new pendant mold charge mass.

LLOYD G. BATES.